US012806876B2

(12) United States Patent
Pialot et al.

(10) Patent No.: US 12,806,876 B2
(45) Date of Patent: Nov. 24, 2026

(54) TIRE-CURING MEMBRANE EQUIPPED WITH A DRAINAGE STRUCTURE

(71) Applicant: COMPAGNIE GENERALE DES ETABLISSEMENTS MICHELIN, Clermont-Ferrand (FR)

(72) Inventors: Frederic Pialot, Clermont-Ferrand (FR); Jose Merino Lopez, Clermont-Ferrand (FR); Alain Faugeras, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 656 days.

(21) Appl. No.: 17/776,702

(22) PCT Filed: Nov. 12, 2020

(86) PCT No.: PCT/FR2020/052071
§ 371 (c)(1),
(2) Date: May 13, 2022

(87) PCT Pub. No.: WO2021/094689
PCT Pub. Date: May 20, 2021

(65) Prior Publication Data
US 2022/0396045 A1 Dec. 15, 2022

(30) Foreign Application Priority Data
Nov. 14, 2019 (FR) ...................................... 1912720

(51) Int. Cl.
*B29D 30/06* (2006.01)

(52) U.S. Cl.
CPC .. *B29D 30/0654* (2013.01); *B29D 2030/0655* (2013.01); *B29D 2030/0658* (2013.01)

(58) Field of Classification Search
CPC ........ B29D 30/0654; B29D 2030/0655; B29D 2030/0658; B29D 2030/0659; B60C 2013/026; B60C 2019/008
(Continued)

(56) References Cited

U.S. PATENT DOCUMENTS 10,339,435 B2 7/2019 Destraves
11,090,889 B2 8/2021 Pialot et al.
(Continued)

FOREIGN PATENT DOCUMENTS

CN 102615750 A 8/2012
JP 2005-66865 A 3/2005
(Continued)

OTHER PUBLICATIONS

Kagami S, JP-2009126019-A, updated machine translation. (Year: 2009).*
(Continued)

*Primary Examiner* — Sedef E Paquette
(74) *Attorney, Agent, or Firm* — VENABLE LLP

(57) ABSTRACT

A curing bladder (7) for a tire has a shape exhibiting symmetry of revolution with a central axis and comprises a flexible wall made of cross-linked rubber, the external surface (20) of the wall comprising an air drainage zone (21) and an air removal zone (22) adjacent to the drainage zone, the bladder (7) being equipped with an air drainage structure comprising elements recessed into the external surface, the recessed elements forming a network of channels (30) extending in the air drainage zone (21) and as far as the air removal zone (22). The depth of a channel (30) of the network, defining the shortest path (31) connecting any point of the network of channels, which is situated in the air drainage zone (21), and the air removal zone (22), increases along the length of the path.

11 Claims, 3 Drawing Sheets

(58) Field of Classification Search
USPC .......................................................... 425/28.1
See application file for complete search history.

(56) References Cited

U.S. PATENT DOCUMENTS

| | | | | |
|---|---|---|---|---|
| 2012/0073725 | A1* | 3/2012 | Lo Presti .................. | B60C 5/14<br>152/450 |
| 2018/0174015 | A1 | 6/2018 | Destraves | |
| 2020/0406565 | A1 | 12/2020 | Pialot et al. | |

FOREIGN PATENT DOCUMENTS

| | | | | |
|---|---|---|---|---|
| JP | 2005246862 | A | * | 9/2005 |
| JP | 2009-126019 | A | | 6/2009 |
| JP | 2009-269235 | A | | 11/2009 |
| WO | 2016/193457 | A1 | | 12/2016 |
| WO | 2019/158852 | A1 | | 8/2019 |

OTHER PUBLICATIONS

Sato Y, JP-2005246862-A, machine translation. (Year: 2005).*
Chen, Xiu-xiong, CN-102615750-A, machine translation. (Year: 2012).*
International Search Report dated Apr. 21, 2021, in corresponding PCT/FR2020/052071 (4 pages).

* cited by examiner

TIRE-CURING MEMBRANE EQUIPPED WITH A DRAINAGE STRUCTURE

BACKGROUND

The invention relates to the field of tyre manufacture and more particularly to a tyre-curing bladder (or membrane) equipped with a drainage structure, and to a method for curing a tyre employing such a bladder.

Tyres are usually obtained by moulding and curing a green tyre inside a curing mould. In order to mould the raised patterns of the mould shells and linings into the green tyre, the external surface of the green tyre is pressed firmly against the rigid internal surface of the mould using a flexible curing bladder. At the start of curing, the flexible wall of the bladder is deployed against the green tyre by inflating it with a pressurized fluid. The pressurized fluid also transfers heat so that the green tyre is cured by the heat energy transmitted by the fluid through the bladder. In order to allow the tyre to be removed at the end of curing, the bladder is then refurled by emptying it of the fluid. For these purposes, the curing bladder needs to be resistant to mechanical stress, temperature and wear, and needs to be able to detach easily from the cured tyre.

As the bladder deploys, air becomes trapped between the internal surface of the green tyre and the external surface of the bladder, in the form of pockets. The air pockets may give rise to defects on the internal surface of the cured tyre. These defects are generally blisters present on the internal surface, or even in the internal structure of the tyre, resulting in appearance defects, in the loss of performance of the tyre, or even in the decohesion of the internal layers of the tyre.

In order to allow pockets of air to be removed, the curing bladder is equipped with a drainage structure which comprises channels recessed into the external surface of the bladder. The channels extend between an air drainage zone, corresponding to the area of contact of the external surface of the bladder with the internal surface of the green tyre, and an air removal zone adjacent to the drainage zone and corresponding to the area of contact of the external surface of the bladder with the curing mould. The drainage and then removal zones extend from the equatorial plane of the bladder as far as the beads via which this bladder is secured in the curing press. In general, these channels are arranged helicoidally on the external surface of the bladder and at regular intervals.

However, in order to allow proper removal of the air, these channels have to be fairly deep. Nevertheless, the bladder has to have the smallest possible thickness in order to be able to transmit heat energy to the green tyre. It has been found, however, that such deep slots weaken the bladder and reduce the service life thereof.

A bladder comprising an air drainage structure is known from application WO2019158852 in the name of the Applicants. The drainage structure comprises first channels of given depth intended to drain the air. These delimit intermediate zones comprising second channels which communicate with one another and with at least one first channel. The second channels are set out with a density higher than that of the first, and have a depth at least a factor of two smaller than that of the first channels. Such a drainage structure makes it possible to limit recourse to deeper channels while at the same time covering the external surface of the bladder with channels as densely packed as possible.

However, the air is not satisfactorily drained or removed. In addition, when the curing bladder is pressed firmly against the interior surface of the green tyre, it is found that the airtight film, or "inner liner" with which said green tyre is lined, enters the channels and progressively blocks them, thereby slowing or blocking the drainage of air and also causing tyre moulding defects.

SUMMARY

One objective of the invention is to overcome the disadvantages of the prior art and propose a novel curing bladder that allows effective drainage and removal of the air, and better quality moulding of the tyre obtained.

This objective is achieved by the invention which proposes a curing bladder for a tyre having a shape exhibiting symmetry of revolution with a central axis and comprising a flexible wall made of cross-linked rubber. The external surface of said wall comprises an air drainage zone intended to come into contact with the internal surface of a green tyre, and an air removal zone adjacent to said drainage zone. The bladder is equipped with an air drainage structure comprising elements recessed into said external surface, said recessed elements forming a network of channels extending in the air drainage zone and as far as the air removal zone.

According to the invention, the depth of a channel of said network, defining the shortest path connecting any point of said network, which is situated in the air drainage zone, and the air removal zone, increases along the length of said path.

Because the air trapped between the external surface of the bladder and the internal surface of the green tyre is distributed as pockets which are dispersed over the entire drainage zone, any one channel of the network allows several of these air pockets situated along its path to be drained towards the removal zone. Because the depth of the channel increases along its path towards the removal zone, the channel is less saturated with air, and all the air pocket situated along said path are drained simultaneously and with greater effectiveness. Furthermore, the fact that the channel is the shortest path connecting any point of said network, which is situated in the air drainage zone, and the air removal zone, allows the air to be drained more rapidly. Thus, the pockets farthest from the removal zone are drained more quickly than with bladders of the prior art.

In addition, a deeper channel will become blocked more slowly than a channel of lesser depth. Because the farthest pockets need to be drained as quickly as possible as the bladder deploys, the channels that drain these remain clear for longer.

Finally, as a consequence, the deepest channels are generally located near the removal zone. The removal zone is a zone experiencing little striction as the bladder is inflated, unlike the rest of the bladder and, particularly, the equatorial part thereof. Thus, recourse to deep channels near the removal zone does not weaken the bladder and the life thereof is thus improved.

As a preference, the constant-depth portions of said path have a length less than or equal to 20 times the depth of said portion, preferably less than or equal to 10 times the depth of said portion. The progressive increase in the depth of the channels, with or without a connection to the confluences or criss-crossings of the channels, allows drainage of air to be optimized across the entire drainage zone and means that it is possible to avoid the channels becoming saturated with air.

More preferentially still, the depth of the channel along said path is a strictly increasing depth.

Advantageously, the width of the channel defining the shortest path connecting a point of said network, which is situated in the air drainage zone, and the air removal zone, decreases along the length of said path.

As a preference, the constant-width portions of said path have a length less than or equal to 20 times the width of said portion, preferably less than or equal to 10 times the width of said portion. Thus, the width and the depth of a channel defining the shortest path to the removal zone, may evolve in such a way that the cross section of said channel increases. The progressive reduction in the width of the channels slows the rate at which they become obstructed by the inner liner. Such an arrangement makes it possible to avoid the channels becoming saturated with air.

More preferentially still, the width of the channel along said path is a strictly decreasing width.

Advantageously, the minimum distance between any point on said external surface belonging to the drainage zone and a channel is less than or equal to 6 mm, and preferably less than or equal to 4 mm. Such construction ensures good coverage of the drainage zone by the network of channels, and more effective draining of the air.

According to a first embodiment variant, the channels have draft angles ranging from 0° to 10° and, more preferably, from 0° to 5° so as to facilitate the demoulding of the bladder when it is being manufactured.

According to a second embodiment variant, the channels have back-draft angles ranging from −10° to 0° and, more preferably, from −5° to 0° so as to increase the cross section of a channel while at the same time maintaining a reduced width. Thus, the inner liner of the green tyre does not penetrate so far into the channels of the bladder and the increase in the cross section of the channel encourages the removal of the air.

The invention also proposes a method for curing a tyre, during which a curing bladder according to the invention is deployed in order to bring the external surface of the wall of said bladder into contact against the interior surface of a green tyre and in order to press the external surface of said green tyre against the walls of a tyre curing mould.

Finally, the invention proposes a tyre obtained by a curing method according to the invention, said tyre thus having on its interior surface ribs of a height equal to or greater than 0.05 mm, which correspond to the respective impressions, in negative, of the channels.

BRIEF DESCRIPTION OF THE FIGURES

The invention will be better understood thanks to the remainder of the description, which is based on the following figures.

DETAILED DESCRIPTION

In the various figures, elements that are identical or similar have the same reference signs. Their description is therefore not systematically repeated.

Figure 1:
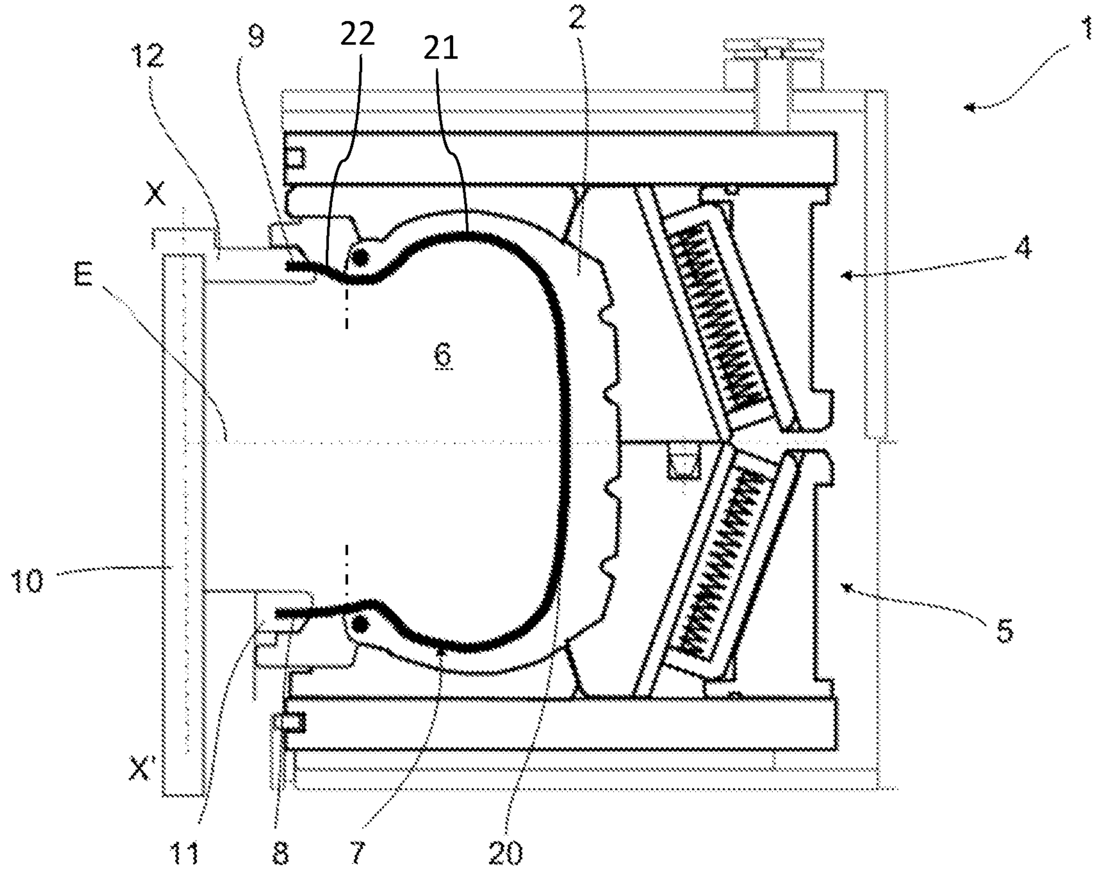
FIG. 1 is a view in radial section of half of a tyre curing mould comprising a bladder according to the invention.

FIG. 1 schematically illustrates half of a curing mould 1 for tyres, the mould being illustrated in a closed position, which corresponds to the operation of curing a green tyre 2. The mould illustrated in FIG. 1 is of the type having two moulding parts 4 and 5 that come into contact with one another at the equatorial plane E of the green tyre. The moulding parts comprise, in a known manner, several rigid parts that define, when the mould is in the closed position, a moulding cavity 6, having a shape exhibiting symmetry of revolution about the central axis X-X'. The internal walls of the cavity are made so as to define, after moulding, the external surface of the tyre. The moulding parts 4 and 5 are driven in movement by actuators provided for this purpose in order to close the moulding cavity 6 before starting the curing of the green tyre and to open it at the end of curing in order to be able to extract the cured tyre. Disposed at the centre of the mould 1 is a central rod 10 that supports two disc-like plates 11, 12 which are arranged at an axial distance from one another and in which a curing bladder 7 is fixed by its ends. The curing bladder 7 is fixed in a fluidtight manner to the plates 11, 12 by its ends or beads 8, 9. Inlet and outlet orifices for the heat transfer fluid communicate in a fluidtight manner with the inside of the bladder and are provided in the plate 11.

In the following text, an axial direction denotes a direction parallel to the axis X-X', a radial direction denotes a direction perpendicular to the axis X-X', and a circumferential direction denotes a direction perpendicular to the radial direction.

The curing bladder 7 is an elastic and expandable hollow body used for moulding and vulcanizing a tyre. The curing bladder 7 comprises a tubular body of which the external surface 20 forms a working part delimited by end parts that form the beads 8, 9 of the bladder.

Figure 2:
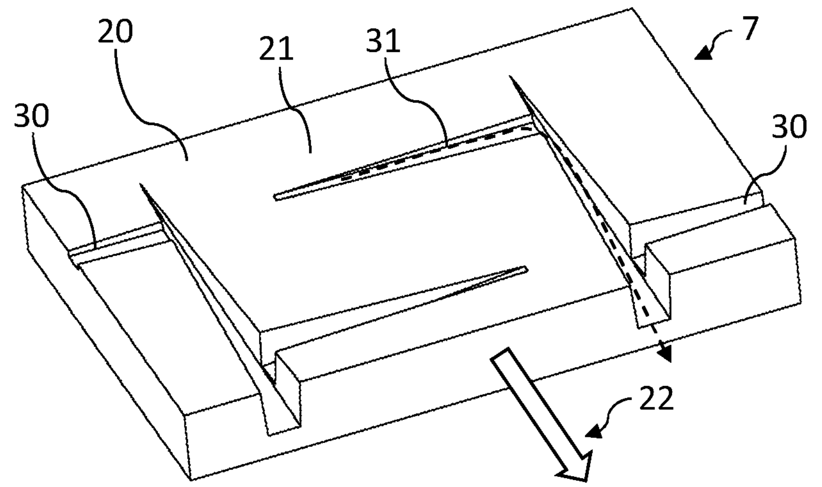
FIG. 2 is a perspective view of a sample of the wall of the bladder of FIG. 1 according to a first embodiment.

A curing bladder according to the invention has been illustrated in FIG. 2.

The external surface 20 of the bladder is divided between an air drainage zone 21 intended to come into contact with the internal surface of a green tyre, and an air removal zone 22 adjacent to said drainage zone and intended to come into contact with part of the internal surface of the curing mould. The bladder is equipped with an air drainage structure comprising elements recessed into said external surface, said recessed elements forming a network of channels 30 extending from the air drainage zone 21 as far as the air removal zone 22.

What is meant by a "network of channels" is that the channels 30 of the network which are situated in the drainage zone 21 are organized, and that each channel forms a junction with at least one other channel. By way of example, the drainage zone may comprise one or more networks of channels that are independent or, in other words, do not communicate with one another; channels of the network may cross one another, form a mesh structure or converge; certain channels of the network may be independent of the other channels and, therefore, not form junctions therewith. Channels that are convergent follow paths from their ends situated in the drainage zone as far as the removal zone forming junctions, such as confluences, with one another. A network may comprise one or more channels which locally define the shortest path connecting any point of said network, which is situated in the air drainage zone 21, and the air removal zone 22.

Figure 3:
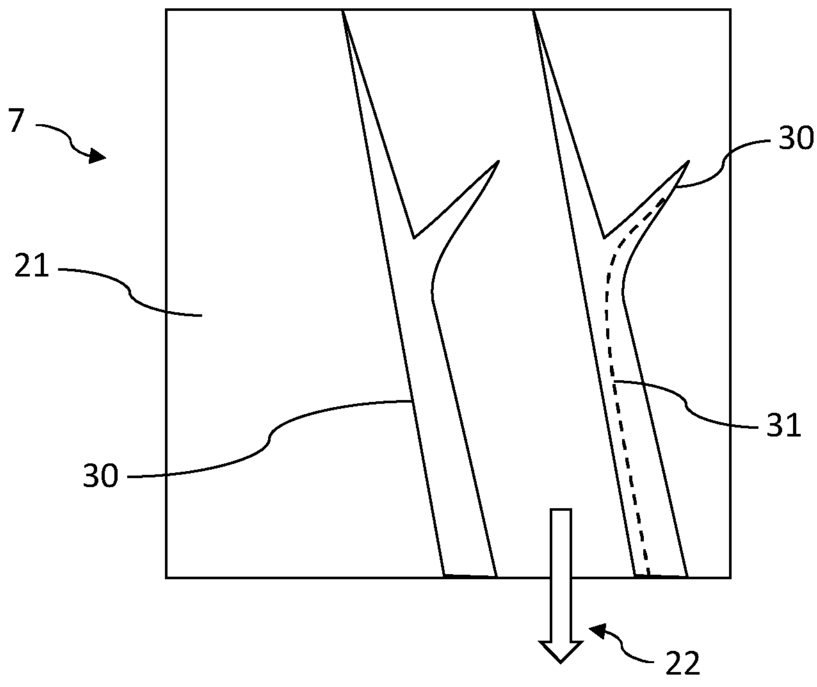
FIG. 3 is a view from above of a sample of the wall of the bladder of FIG. 1 according to a second embodiment.

According to the invention, the depth of a channel 30 of the network, defining the shortest path 31 (FIGS. 2 and 3) connecting any point of said network, which is situated in the air drainage zone 21, and the air removal zone 22, increases along the length of said path.

What is meant by "increases" is that the change in the underlying parameter, namely the depth of the channel, along said path may, at certain points, be zero and, at other points, be strictly increasing. In other words, along said path, the difference in depth between a point farther from the removal zone and a point closer to the removal zone is greater than or equal to 0.

Figure 4:
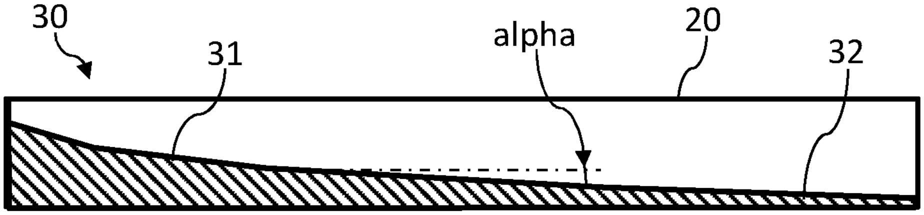
FIG. 4 is a view in longitudinal section of a channel of the sample of FIG. 3, according to a first embodiment.

By way of example, a channel 30 has a depth and a width of between 0.01 mm and 1 mm. The wall 32 constituting the bottom of the channel forms an angle alpha with a plane parallel to the external bearing surface 20 of the bladder (FIG. 4). Along the shortest path 31, said angle is between 0.01° and 20°, preferably between 0.1° and 15°, and more preferably between 0.2° and 10°. The dimensional parameters of the channels are measured using metrology means, on a laid-flat or held-flat sample of the bladder 7.

Figure 5:
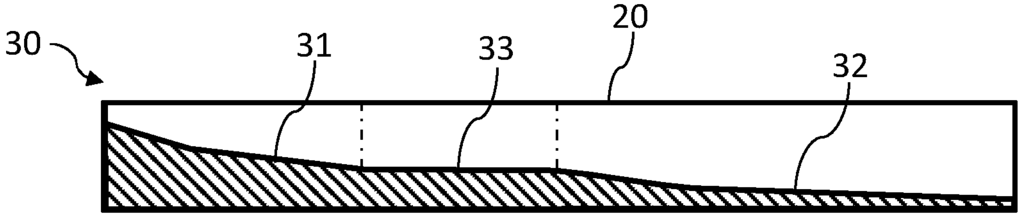
FIG. 5 is a view in longitudinal section of a channel of the sample of FIG. 3 according to a second embodiment.

As a preference, the constant-depth portions 33 of said path 31 have a length less than or equal to 20 times the depth of said portion, preferably less than or equal to 10 times the depth of said portion (FIG. 5).

As a preference, the depth of the channel along said path 31 is a strictly increasing depth (FIG. 4).

Advantageously, the width of the channel defining the shortest path connecting a point of said network, which is situated in the air drainage zone, and the air removal zone, decreases along the length of said path (not depicted). By way of example, the width of the channel, along said path, may also be an increasing width.

As a preference, the constant-width portions of said path have a length less than or equal to 20 times the width of said portion, preferably less than or equal to 10 times the width of said portion.

As a preference, the width of the channel along said path is a strictly decreasing width.

According to a first embodiment variant, the channels have a draft angle ranging from 0° to 10° with respect to a demoulding direction perpendicular to the bearing surface of the bladder, so as to facilitate the demoulding of the bladder.

Alternatively, and according to a second embodiment variant, the channels have back-draft angles ranging from −10° to 0° and, more preferably, from −5° to 0° with respect to said demoulding direction, so as to increase the cross section of a channel while at the same time maintaining a reduced width. Thus, the inner liner of the green tyre does not penetrate so far into the channels 30 of the bladder and the increase in the cross section of the channel encourages the removal of the air.

As a preference, the intersection of the external surface 20 of the bladder 7 and a channel 30 is rounded. Likewise, the intersection or intersections between the various walls of the channel are rounded.

As a preference, the minimum distance between a point on the external surface 20 of the bladder 7, belonging to the drainage zone 21, and a channel 30 is less than or equal to 6 mm, and preferably less than or equal to 4 mm.

Furthermore, the drainage structure according to the invention may advantageously be combined with a nonstick coating incorporated into the external surface of the curing bladder and intended to make it easier to separate the tyre and the curing bladder after moulding. Such a combination makes it possible to ensure removal of the air during moulding and detachment of the bladder after moulding, even when the choice has been made not to employ a mould dressing, which is to say an additional liquid substance aimed at facilitating demoulding and that is usually sprayed onto the internal surface of the green tyre prior to moulding.

In operation, the green tyre 2 is introduced into the moulding cavity 6 and is centred with respect to the axis X-X' of the mould. When pressurized heat transfer fluid is injected into the interior of the curing bladder 7, generally steam or air mixed with nitrogen, it expands and takes on a toroidal overall shape inside the tyre casing. When it opens out under the effect of the pressure of the heat transfer fluid, its flexible wall stretches until the green casing is pressed against the rigid walls of the curing mould. During this phase, the bladder has to remove the air included in the tyre during the building thereof. To this end, the surface of the bladder has a drainage structure forming a network of channels 30 extending from the air drainage zone 21 as far as the air removal zone 22.

In order to manufacture a bladder 7, use is made, in a well-known manner, of a vulcanizing press having a core and two rigid, metal shells, the bladder being formed by the sleeve obtained by compression moulding a block of butyl rubber inserted between the shells and the core. The pattern on the external surface of the useful part of the bladder is imprinted on the core, which is a convex part that is easier to machine than the shells, which are concave parts. The bladder is thus vulcanized inside out, the relief structure being situated inside the bladder when it is manufactured. After vulcanization, the bladder is extracted and turned right side out, like a sock, so as to bring its relief structure to the exterior of the bladder.

Figure 6:
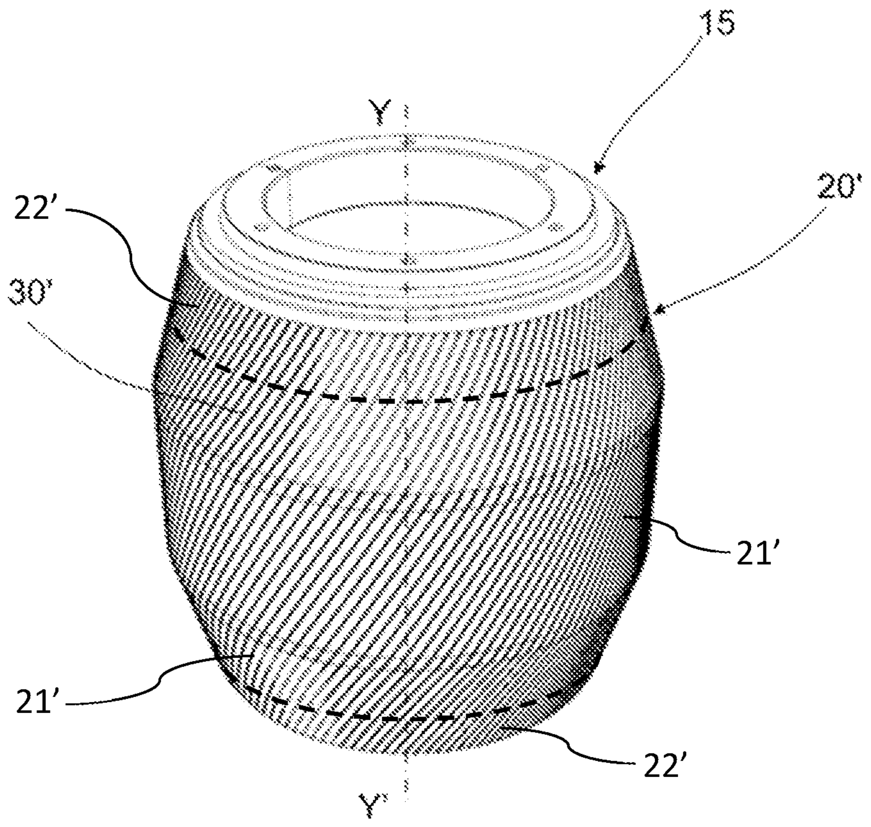
FIG. 6 is a perspective view of a core of a curing mould for a curing bladder.

FIG. 6 illustrates an example of a core 15 used in a vulcanizing mould for a curing bladder 7 according to the invention; The core 15 has a shape exhibiting symmetry of revolution about an axis Y-Y', this axis coinciding with that of the green tyre when the bladder and the green tyre are arranged in the curing mould 1.

The core 15 has an oval shape, and more particularly it has three parts of substantially equal axial length, namely two frontal frustoconical parts linked by a cylindrical central part. The external surface 20' of the core 15 constitutes the negative of the useful part 20 of the curing bladder 7 and, to this end, has splines 30' distributed uniformly over the external surface 20' of the core for moulding corresponding ribs in the curing bladder 7. The external surface 20' of the core comprises a first zone 21' corresponding to the air drainage zone 21, and a second zone 22' corresponding to the air removal zone 22.

While the bladder is being manufactured, the core moulds the ribs on its internal part, and the bladder is then turned right side out in order to be placed in the curing mould. Two adjacent ribs of the bladder define, between one another, a channel 30, a plurality of channels 30 thus being distributed uniformly over the external surface of the bladder. The splines 30' are oriented such that the channels of the bladder drain the air from the crown of the green tyre in the direction of the beads thereof. The splines 30' are generally inclined with respect to a meridian line of the core of the bladder, but can also be parallel thereto. In the example illustrated in FIG. 2, the splines 30' are mutually parallel and form an angle of about 30° with the meridian line of the core, and each spline starts from a first circumferential position of the core at one of its ends, which forms one of the beads of the bladder, and ends at a second circumferential position of the core at the opposite end.

Other variants and embodiments of the invention can be envisaged without departing from the scope of its claims.

Thus, according to a (not illustrated) variant embodiment of the invention, a network of channels comprises first channels delimiting an intermediate zone, and second channels recessed into the intermediate zone. The depth of a channel defining the shortest path connecting a point on the intermediate zone to a first channel increases along said path.

The invention claimed is:

1. A curing bladder for a tire having a shape exhibiting symmetry of revolution with a central axis and comprising a flexible wall made of cross-linked rubber, an external surface of the flexible wall comprising an air drainage zone configured to come into contact with an internal surface of a green tire, and an air removal zone adjacent to the air drainage zone, the curing bladder being equipped with an air drainage structure comprising elements recessed into the external surface, the recessed elements forming one or more networks of channels extending in the air drainage zone and as far as the air removal zone, wherein a depth of a channel of a network of the one or more networks of channels defining a shortest path connecting any two points of the network of the one or more networks of channels, which is situated in the air drainage zone and the air removal zone, increases along a length of the shortest path, and an angle a that a wall constituting a bottom of the channel defining the shortest path forms with a plane parallel to the external surface of the curing bladder is between 0.01° and 20° along the shortest path, and wherein the one or more networks of channels include a multi-channel network having at least two channels including a channel starting the multi-channel network in the air drainage zone and a channel ending the multi-channel network by extending to the air removal zone, the multi-channel network having two channels forming a junction with one another, a shortest path of the multi-channel network extending through the two channels first channel, the second channel, and the junction and connecting a beginning of the multi-channel network in the air drainage zone to an end of the multi-channel network at the air removal zone, the beginning of the multi-channel network in the air drainage zone being a beginning of the channel starting the multi-channel network in the air drainage zone but being separate from channels other than the channel starting the multi-channel network in the air drainage zone.

2. The curing bladder according to claim 1, wherein a constant-depth portion of the channel defining the shortest path has a length less than or equal to 20 times a depth of the constant-depth portion.

3. The curing bladder according to claim 1, wherein the depth of the channel defining the shortest path is a strictly increasing depth.

4. The curing bladder according to claim 1, wherein a width of the channel defining the shortest path decreases along the length of the shortest path.

5. The curing bladder according to claim 4, wherein, for the channel defining the shortest path, a constant-width portion of the shortest path has a length less than or equal to 20 times a width of the constant-width portion.

6. The curing bladder according to claim 4, wherein the width of the channel defining the shortest path is a strictly decreasing width.

7. The curing bladder according to claim 1, wherein a minimum distance between any point on the external surface belonging to the air drainage zone and a channel is less than or equal to 6 mm.

8. The curing bladder according to claim 1, wherein one or more channels of the one or more networks of channels have back-draft angles ranging from −10° to 0° with respect to a demolding direction perpendicular to the external surface of the curing bladder.

9. The curing bladder according to claim 1, wherein one or more channels of the one or more networks of channels have draft angles ranging from 0° to 10° with respect to a demolding direction perpendicular to the external surface of the curing bladder.

10. A method of curing a tire, the method comprising deploying the curing bladder of claim 1 in order to bring the external surface of the wall into contact against an interior surface of the green tire and in order to press the external surface of the green tire against walls of a tire curing mold.

11. A tire obtained by the method according to claim 10, the tire having on its interior surface ribs of a height greater than or equal to 0.05 mm, which correspond to respective impressions, in negative, of the channels of the one or more networks of channels.

* * * * *